US010796136B2

(12) United States Patent
Mardikar

(10) Patent No.: US 10,796,136 B2
(45) Date of Patent: *Oct. 6, 2020

(54) SECONDARY SOURCE AUTHENTICATION OF FACIAL BIOMETRIC

(71) Applicant: American Express Travel Related Services Company, Inc., New York, NY (US)

(72) Inventor: Upendra Mardikar, San Jose, CA (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,789

(22) Filed: Oct. 11, 2018

(65) Prior Publication Data
US 2019/0042837 A1 Feb. 7, 2019

Related U.S. Application Data

(63) Continuation of application No. 15/273,225, filed on Sep. 22, 2016, now Pat. No. 10,127,435.
(Continued)

(51) Int. Cl.
*G06F 21/32* (2013.01)
*G06K 9/00* (2006.01)
*G06K 9/62* (2006.01)

(52) U.S. Cl.
CPC ......... *G06K 9/00288* (2013.01); *G06F 21/32* (2013.01); *G06K 9/00892* (2013.01); *G06K 9/6202* (2013.01)

(58) Field of Classification Search
CPC ........... G06K 9/00288; G06K 9/00892; G06K 9/6202; G06K 9/00268; G06K 9/6201;
(Continued)

(56) References Cited

U.S. PATENT DOCUMENTS

| 7,684,651 B2 | 3/2010 | Tang |
| 8,644,563 B2 | 2/2014 | Akbarzadeh |

(Continued)

FOREIGN PATENT DOCUMENTS

| CN | 104243276 | 12/2014 |

OTHER PUBLICATIONS

Cui Xinyu (CN 104 243 276) (The English translation of the patent provided in extended European search repot pp. 1-15 is referred to in the rejection).*

(Continued)

*Primary Examiner* — Sheela C Chawan
(74) *Attorney, Agent, or Firm* — Thomas Horstemeyer, LLP

(57) ABSTRACT

A system may receive a primary image containing a first set of facial feature data. The primary image may be sent by a facial recognition device for association with a user account. The system may also retrieve a secondary image from a secondary image source. The secondary image may contain a second set of facial feature data. The secondary image may further depict a user associated with the user account. The system may then compare the first set of facial feature data to the second set of facial feature data to determine whether the primary image depicts the user associated with the user account.

20 Claims, 3 Drawing Sheets

Related U.S. Application Data

(60) Provisional application No. 62/233,106, filed on Sep. 25, 2015.

(58) Field of Classification Search
CPC ...... G06K 9/46; G06K 9/00483; G06F 21/32; G06Q 50/01; G06Q 10/01
USPC ............... 382/118, 115, 195; 705/14.66
See application file for complete search history.

(56) References Cited

U.S. PATENT DOCUMENTS

| | | |
|---|---|---|
| 8,810,684 B2 | 8/2014 | Ganong |
| 9,235,782 B1 | 1/2016 | Zomet |
| 9,275,269 B1 | 3/2016 | Li |
| 2010/0287053 A1 | 11/2010 | Ganong |
| 2015/0081495 A1* | 3/2015 | Randall ............ G06Q 40/02 705/35 |

OTHER PUBLICATIONS

USPTO; Non-Final Office Action dated Apr. 5, 2018 in U.S. Appl. No. 15/273,225.
USPTO; Notice of Allowance dated Sep. 10, 2018 in U.S. Appl. No. 15/273,225.

* cited by examiner

SECONDARY SOURCE AUTHENTICATION OF FACIAL BIOMETRIC

CROSS-REFERENCE TO RELATED APPLICATIONS

This application is a continuation of, claims priority to and the benefit of, U.S. Ser. No. 15/273,225 filed Sep. 22, 2016, allowed and now U.S. Pat. No. 10,127,435, entitled "SYSTEMS AND METHODS FOR AUTHENTICATING FACIAL BIOMETRIC DATA AGAINST SECONDARY SOURCES." The '225 application claims priority to U.S. Provisional Patent Application Ser. No. 62/233,106 filed Sep. 25, 2015, entitled "SYSTEMS AND METHODS FOR AUTHENTICATING FACIAL BIOMETRIC DATA AGAINST SECONDARY SOURCES." Both of which are incorporated herein by reference in their entirety for all purposes.

FIELD

The present disclosure relates to user authentication by capturing facial biometric data of a user and validating the data against images of the user from secondary sources.

BACKGROUND

User authentication systems play an important security role in data protection as sensitive data is increasingly stored behind electronic authentication walls. Mobile devices, computers, and secure rooms may all be protected by various types of authentication. Many mobile devices may authenticate users using a four-digit pin or a simple fingerprint, for example. These authentication systems tend to limit access to sensitive data to those individuals having the correct authentication key, but may be vulnerable to attack in some instances.

As security systems mature, facial recognition as a security tool may become more viable. Facial recognition may be a form of biometric authentication that may be used to authenticate a user. However, in some instances, an attacker trying to take over a user identity may register fraudulent biometric data in an attempt to pose as the user associated with a user account. In the event of such an attack, the user may be locked out of his own accounts because the registered facial biometric data for the user accounts may correspond to the third-party face registered by the attacker, rather than the user's face.

SUMMARY

A system, method, and computer readable medium (collectively, the "system") is disclosed for validating a user image obtained from a facial recognition device against an image obtained from a secondary image source. The system may receive a primary image containing a first set of facial feature data. The primary image may be sent by a facial recognition device for association with a user account. The system may also retrieve a secondary image from a secondary image source. The secondary image may contain a second set of facial feature data. The secondary image may further depict a user associated with the user account. The system may then compare the first set of facial feature data to the second set of facial feature data to determine whether the primary image depicts the user associated with the user account.

In various embodiments, the system may transmit a successful result in response to the primary image depicting the user associated with the user account. The secondary image source may comprise a social media site. The first set of facial feature data may comprise at least one of a position, a size, or a shape of at least one of an eye, a nose, a cheekbone, or a jaw. The system may further request authentication information in response to an ambiguous comparison result from the comparing the first set of facial feature data to the second set of facial feature data. The system may generate a score based on the comparing the first set of facial feature data to the second set of facial feature data and indicate a registration failure in response to the score being below a threshold.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
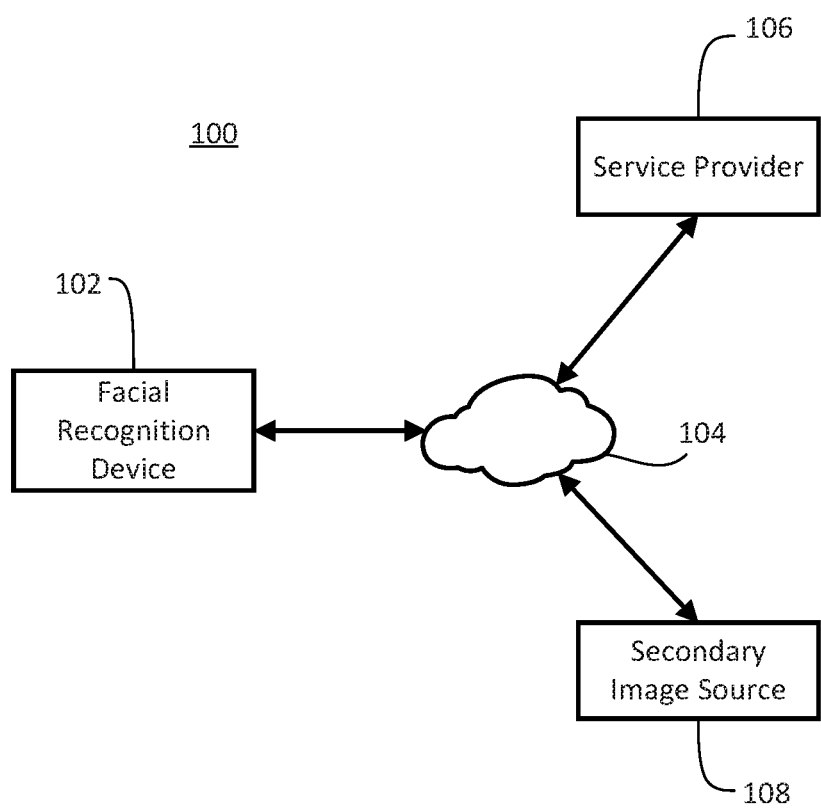
FIG. 1 illustrates an exemplary system for user authentication using secondary image sources to verify facial biometrics, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "image template", "facial template", "template", or other similar phrases may include a digital representation and/or other representation of facial biometric data. A template may identify features, edges, dimensions, and other information used to identify the biometric facial information of an individual. The template may be used by a facial recognition system to identify and/or verify a person from an image or video by comparing selected facial features. Images and templates may be compared using facial recognition programs such as those available under the tradenames FACIAL DETECTION SOFTWARE and/or KAIROS.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. For example, a first template may match a second template in response to the templates being sufficiently similar even though the images from which the templates are generated may not be identical. Similarly, as used herein, "authenticate" or similar terms may include an exact authentication, a partial authentication, authenticating a subset of data, a correspondence, satisfying certain criteria, an association, an algorithmic relationship and/or the like.

The present disclosure provides a system, method, and computer program product for verifying facial biometrics against secondary image sources. The system may receive a facial image from a user requesting to associate the facial image with a user account. The system may then acquire secondary images from secondary image sources that are likely images of the user. The facial image submitted by the user may then be compared to the secondary images to determine whether the user's face matches with the images expected to contain the user's face. A match may signal that the account owner is attempting to register their facial biometrics, and no match may indicate that additional caution should be taken as an attacker may be attempting to improperly register facial biometrics not belonging to the account owner.

With reference to FIG. 1, an exemplary system 100 for validating facial biometrics is shown, in accordance with various embodiments. System 100 may include a facial recognition device 102. Facial recognition device 102 may comprise any device capable of scanning, storing, processing, capturing and/or communicating a facial image or image template. For example, facial recognition device 102 may take the form of a computer or processor, or a set of computers/processors, such as a computer, laptop, notebook, hand held computer, personal digital assistant, cellular phone, smart phone (e.g., iPhone®, BlackBerry®, Android®, etc.), tablet, wearable (e.g., smart watch and smart glasses), camera, or any other device capable of capturing facial biometrics in a suitable form for comparison (e.g., a facial image or a facial template).

In various embodiments, facial recognition device 102 may be in communication with service provider 106 and/or secondary image source 108 over network 104. Service provider 106 may provide access to and/or maintain protected data associated with user accounts. The user accounts may be, for example, transaction accounts that grant authenticated users access to personally identifying information (PII), transaction account details, or other sensitive information. The user accounts may be associated with facial biometric data that may be used to validate users authorized to access the user accounts. Service provider 106 may maintain client-facing servers in communication with facial recognition device 102. The servers operated by service provider 106 may be, for example, web servers and backend servers configured to provide access to user account data for authenticated users. Service provider 106 may also provide backend services for communication with and/or image retrieval from secondary image source 108.

In various embodiments, secondary image source 108 may maintain images of users with likely association to the user accounts maintained by service provider 106. For example, secondary image source 108 may include social media sources such as Facebook®, Instagram®, LinkedIn®, Reddit®, Twitter®, and/or Pinterest® for example. Secondary image source 108 may also include image repositories such as, for example, Imgur®, Flickr®, and/or iCloud®. Secondary image source 108 may also comprise other image sources such as business web sites, private web sites, school web sites, or other image sources containing images that are associated with a user and may be identified and/or retrieved by service provider. Secondary image source 108 may store the images in a database or other permanent storage structure for later access. Facial recognition device 102, service provider 106, and secondary image source 108 may communicate facial images and/or facial templates across network 104.

In various embodiments, network 104 may be an electronic communication system accomplishing communication among the parties through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, TDEA, AES, ECC, PKI, GPG (GnuPG), and symmetric and asymmetric cryptosystems.

Figure 2:
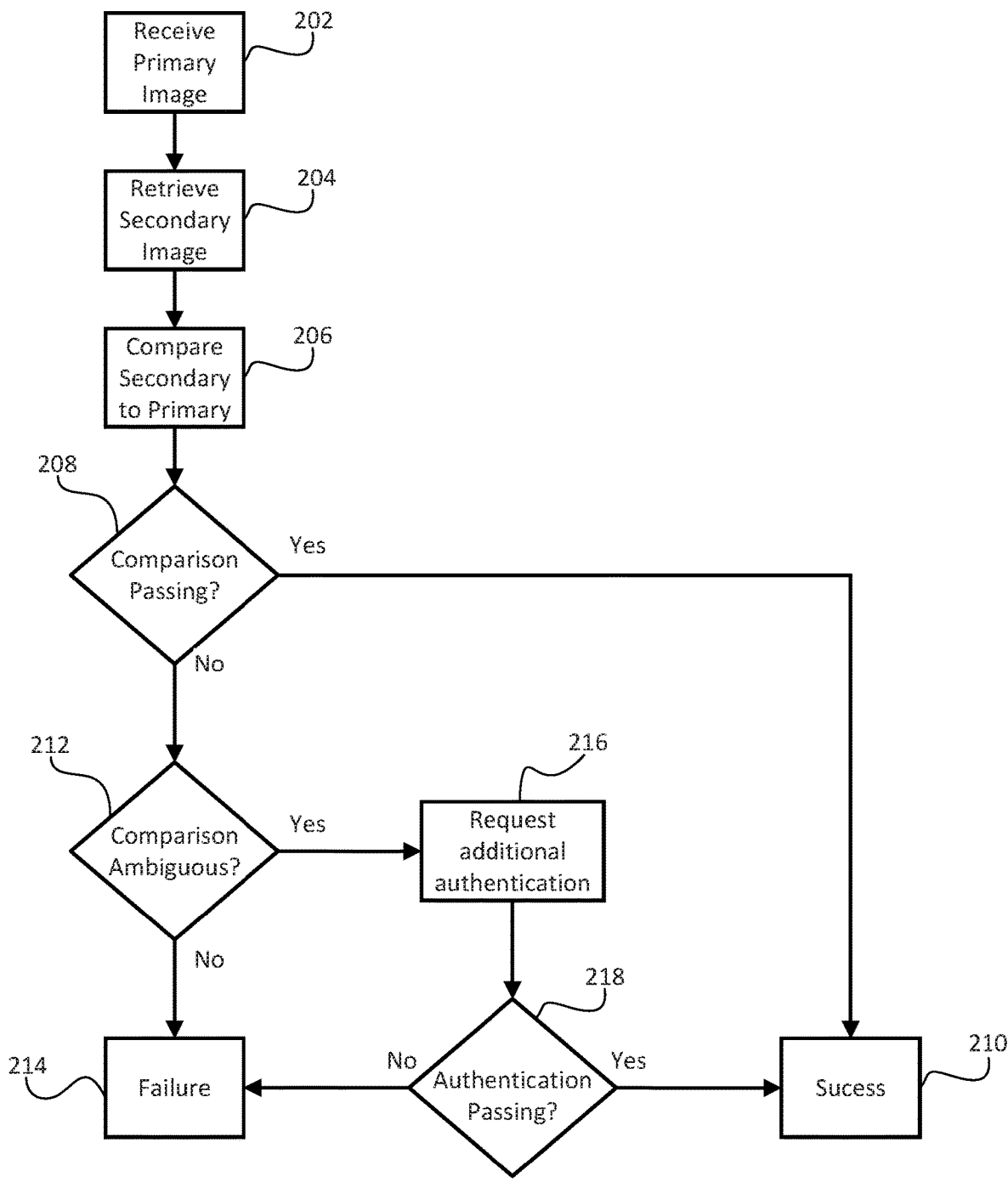
FIG. 2 illustrates an exemplary process for comparing an image from a secondary image source to a user-submitted image to verify facial biometrics, in accordance with various embodiments.

With reference to FIG. 2, a process 200 for image validation by comparison of a user image from facial recognition device 102 with a secondary image from a secondary image source 108 is shown, in accordance with various embodiments. Process 200 may be executed by service provider 106, for example, in response to a request to register facial biometric data to a user account with service provider 106. In various embodiments, process 200 may also be executed locally on facial recognition device 102, so that biometric data may be retained locally on facial recognition device 102 and transmission of biometric data may be avoided. Service provider 106 may receive a primary image (Block 202). The primary image may be an image captured by facial recognition device 102 and/or and sent from facial recognition device 102 via a web interface or application running locally on facial recognition device 102. The primary image may be a facial image and/or image template capturing facial biometric data of a user associated with a user account. The primary image may be used to identify biometric data by extracting landmarks and/or features from a facial image or image template. For example, landmarks and features may include relative position, size, and/or shape of the eyes, nose, cheekbones, and jaw and the texture and/or color of the eyes, skin, hair, or other identifiable features. The primary image may be sent over a network 104 such as, for example, the Internet to service provider 106.

In various embodiments, service provider 106 may retrieve a secondary image (Block 204). The secondary image may be an image likely to contain biometric data of the user associated with the user account (i.e., an image or image template of the user). For example, the secondary image may be an image retrieved from Facebook® using the Facebook® login API or another API made available by social media sites to developers for integrating content of the social media site beyond the limited scope of the social media site itself. In that regard, a user authentication token indicating that the user is logged into the social media site may be used to retrieve information privately available to the user on his or her user account, if allowed by privacy settings. Similarly, the secondary image may be retrieved by conducting a search on a social media site and analyzing the search results for likely user images.

For example, service provider 106 may access images publicly available on a social media site by searching a user name. The results may be filtered using other information associated with the user account by service provider 106 such as email address, phone number, birth date, gender, address, and/or other information available to identify the user associated with a user account. In that regard, service provider 106 may ignore or deemphasize images in search results that are unlikely to depict the user associated with the user account.

For example, a service provider may search for secondary images of a user named John Smith. A search for "John Smith" on a social media site may return hundreds of profiles with various images, but since the user John Smith has a birth date of Jan. 1, 1985 any search results listing a different birth date may be unlikely, or less likely, to depict the user John Smith relative to those listing the correct birth date or no birth date.

In various embodiments, service provider 106 may further identify secondary images by conducting an image search using a public search engine such as Google®. In various embodiments, service provider 106 may retrieve one or more images and/or image templates from one or more secondary image sources to validate the primary image with improved accuracy.

In various embodiments, service provider 106 may compare the secondary image to the primary image (Block 206). The comparison may be used to assess whether the primary image and secondary image are likely to depict the same person, and whether that person is likely to be the account holder. Service provider 106 may identify biometric features in the secondary image and primary image for comparison. The comparison may include determining whether the primary image and secondary image capture biometric data of the same user. The comparison may also include assessing the likelihood that the user in the secondary image is actually the user associated with the user account. The comparison may then be used to score the primary image and determine whether the authentication has passed, failed, or is subject to further verification. For example, service provider 106 may determine that the secondary image matches the primary image with 95% certainty, and that the secondary image accurately represents the user associated with the user account with 85% certainty. The service provider may then score the primary image based on the comparison. Continuing the above example, service provider 106 may score the primary image as 8 out of 10. Although a scale of 0 to 10 is illustrated in the example, other scales and scoring techniques may be used to score the primary image and/or secondary image.

In various embodiments, service provider 106 may assess whether the comparison passed (Block 208). The comparison may pass if the primary image (or secondary image, depending on the configuration of system 100) received a satisfactory score in the comparison step. If the image comparison resulted in a passing score and/or the primary image and secondary image are satisfactory matches, then the primary image may be successfully validated (Block 210). Service provider may process the primary image as an image containing biometric data of the user associated with the user account. However, if the image comparison did not result in a passing score and/or the images are not satisfactory matches then further analysis (of additional features) may be desirable.

In various embodiments, service provider 106 may determine whether the comparison between the primary image and secondary image was ambiguous (Block 212). The comparison between the primary image and secondary image may yield ambiguous results, for example, if service provider 106 cannot determine with sufficient certainty that the primary and secondary image contain biometric data of the same user. The comparison may also yield ambiguous results if service provider 106 cannot determine with satisfactory certainty the secondary image is in fact an image of the user associated with the user account. Service provider 106 may request additional authentication in response to an ambiguous comparison of the primary image and secondary image (Block 216). For example, service provider 106 may require the user to enter a one-time password, personal information such as a date of birth or social security number, a transaction account number, or an answer to a security question. If the comparison was not ambiguous, and the comparison did not pass, then the system may deduce that the comparison failed and signal image validation failure (Block 214). Although service provider in exemplary process 200 checks for failing comparison results after passing results and ambiguous results, service provider 106 may be configured to check for failing comparison results, passing comparison results, and/or ambiguous comparison results in any order and may omit checking any of the aforementioned results as desired.

In various embodiments, process 200 may be executed on system 100 to compare images (of a user associated with a user account) to an incoming image. By evaluating the images, system 100 may tend to protect users against identity takeovers in the form of fraudulent images submitted by attackers.

Figure 3:
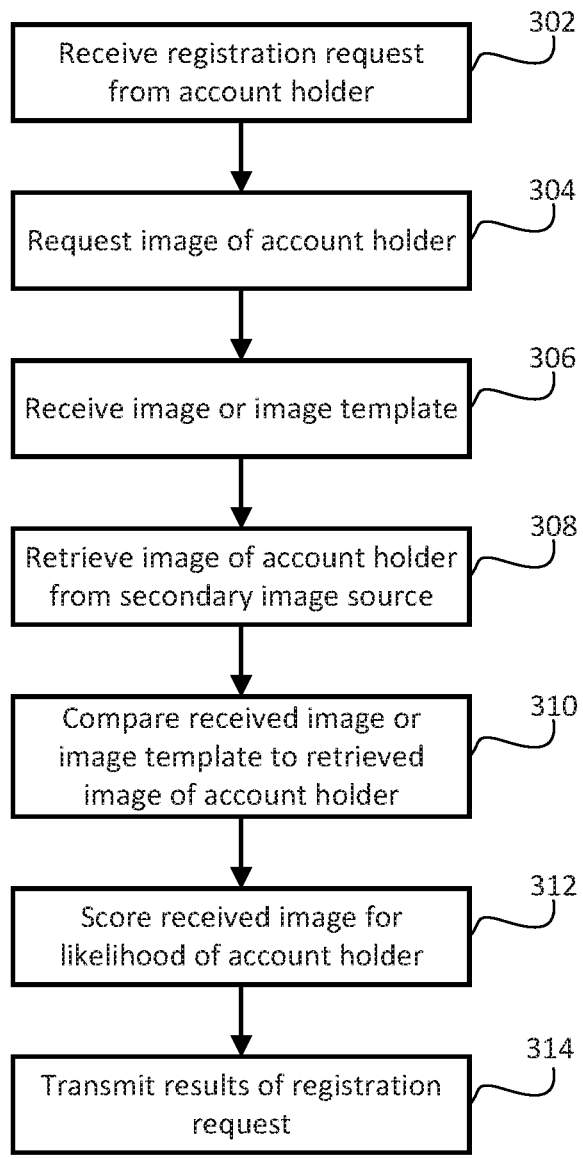
FIG. 3 illustrates an exemplary method of verifying user-submitted facial biometrics associated with a user account, in accordance with various embodiments.

With reference to FIG. 3, a method 300 for validating facial biometric data is shown, in accordance with various embodiments. Method 300 may be used by service provider 106 or other actors to validate facial biometric data for association with a user account. Service provider 106 may receive a registration request from an account holder (Block 302). The registration request may originate from facial recognition device 102 that is logged into a user account. The registration request may be a request to associate facial biometric data with the user account that facial recognition device 102 is logged into.

In various embodiments, service provider 106 may request an image of the account holder (Block 304). The image request may result in a prompt displayed on facial recognition device 102 for the user to scan or photograph their face for submission to service provider 106. The user may use facial recognition device 102 to capture facial biometric data (e.g., a facial image or facial template) identifying facial features such as relative position, size, and/or shape of the eyes, nose, cheekbones, and jaw and the texture and/or color of the eyes, skin, hair, or other identifiable features, for example. Facial recognition device 102 may submit the captured facial biometric data and/or previously captured and stored facial biometric data to service provider 106. Service provider 106 may receive an image or image template from facial recognition device 102 (Block 306). In various embodiments, facial recognition device 102 may send an image template rather than an image to limit the public communication of raw biometric data contained in an image.

In various embodiments, service provider 106 may retrieve a secondary image of the account holder from secondary image source 108. Service provider 106 may identify facial features in the secondary image for comparison with the primary image. Service provider may also convert the secondary image to an image template for comparison to an image template derived from the primary image. The image may be converted to an image template by creating a digital representation of the facial features in the image that captures biometric data but may not render into an image. Service provider 106 may retrieve multiple secondary images from multiple secondary image sources to enhance verification of the primary image as desired. In various embodiments, service provider 106 may compare the received primary image to the secondary image retrieved from the secondary image source (Block 308). The comparison may be similar to the comparison of block 206 in FIG. 2, as disclosed above.

In various embodiments, service provider may score the primary image (received in Block 306) for the likelihood that the primary image depicts the account holder (Block 312). The score may be used to determine if the primary image should be associated with the account, or if there is a significant chance that the primary image may be a fraudulent image. The comparison and scoring of blocks 310 and 312 are described in greater detail above with reference to FIG. 2. Service provider 106 may transmit the results of the registration request to facial recognition device 102 (Block 314) in response to the comparison. The results may indicate registration failure in response to the primary image and secondary image not matching and/or the score being below a failing threshold. The results may also indicate success in response to the primary image and secondary image matching to a satisfactory degree and/or the score being above a passing threshold. The results may further indicate that additional authentication is requested prior to completing the registration of the primary image with the user account.

The systems and methods herein may provide security for incoming requests to register user biometric data. Facial biometric data may be gathered by a facial recognition device, either in real time or at an earlier time, and submitted for authentication. The service provider may use images of the user from secondary sources to determine a likelihood that the submitted image accurately depicts an account holder. In that regard, system of the present disclosure may tend to prevent identity takeover by attackers submitting fraudulent facial biometric data. An attacker may attempt to submit a fraudulent image of a user, but the fraudulent image may not match with the secondary images of the user available from secondary image sources. In that regard, fraudulent images may be detected to limit identity takeover.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof (e.g., facial recognition device 102, service provider 106, and/or secondary image source 108) may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to a network (e.g., network 104) via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.128.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

In yet another embodiment, the devices and processes disclosed herein may be configured with additional biometric security system that may be used for providing biometrics as a secondary form of identification (i.e., in addition to the facial biometric data described herein). The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

The security devices and processes of the present disclosure may protect sensitive data such as internal data. Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file.

The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers.

More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method comprising:
receiving, by a processor, a primary image of a user containing a first set of facial feature data;
comparing, by the processor, the first set of facial feature data to a second set of facial feature data associated with a secondary image of the user, wherein the secondary image is from a social media source; and
authenticating, by the processor, that the primary image depicts the user associated with a user financial account based at least in part on the comparison indicating the first set of facial feature data is representative of the user identified by the second set of facial feature data.

2. The method of claim 1, wherein the social media source comprises a social media site.

3. The method of claim 1, wherein the first set of facial feature data comprises at least one of a position, a size, or a shape of at least one of an eye, a nose, a cheekbone, or a jaw.

4. The method of claim 1, further comprising transmitting, by the processor, a successful result in response to the primary image depicting the user associated with the user financial account.

5. The method of claim 1, further comprising requesting, by the processor, authentication information in response to an ambiguous comparison result from the comparing the first set of facial feature data to the second set of facial feature data, wherein the ambiguous comparison is generated when the comparison between the first set of facial feature data and the second set of facial feature data generates a score that fails to meet a threshold.

6. The method of claim 1, further comprising generating, by the processor, a score based on the comparing the first set of facial feature data to the second set of facial feature data.

7. The method of claim 6, further comprising indicating, by the processor, a registration failure in response to the score being below a threshold.

8. The method of claim 1, further comprising searching, by the processor, the social media source using profile data associated with the user, to obtain the secondary image.

9. The method of claim 1, wherein at least one of the primary image or the secondary image are converted to an image template.

10. The method of claim 1, further comprising receiving, by the processor, a request to associate the primary image with the user financial account.

11. The method of claim 1, further comprising obtaining, by the processor, an authentication token associated with the user to access private content on the social media source.

12. The method of claim 1, further comprising retrieving, by the processor, the second set of facial feature data by using an authentication token and an application programming interface (API) of the social media source.

13. The method of claim 1, wherein the secondary image is retrieved from the social media source after receiving a request to associate the primary image with the user financial account.

14. The method of claim 1, wherein the secondary image from the social media source is an expected image of the user.

15. A computer-based system, comprising:
a processor; and
a tangible, non-transitory memory configured to communicate with the processor, the tangible, non-transitory memory having instructions stored thereon that, in response to execution by the processor, cause the processor to perform operations comprising:
receiving, by the processor, a primary image of a user containing a first set of facial feature data;
comparing, by the processor, the first set of facial feature data to a second set of facial feature data associated with a secondary image of the user, wherein the secondary image is from a social media source; and
authenticating, by the processor, that the primary image depicts the user associated with a user financial account based at least in part on the comparison indicating the first set of facial feature data is representative of the user identified by the second set of facial feature data.

16. The system of claim 15, further comprising receiving, by the processor, a request to associate the primary image with the user financial account.

17. The system of claim 15, further comprising obtaining, by the processor, an authentication token associated with the user to access private content on the social media source.

18. The system of claim 15, further comprising retrieving, by the processor, the second set of facial feature data by using an authentication token and an application programming interface (API) of the social media source.

19. The system of claim 15, further comprising requesting, by the processor, authentication information in response to an ambiguous comparison result from the comparing the first set of facial feature data to the second set of facial feature data.

20. An article of manufacture including a non-transitory, tangible computer readable storage medium having instructions stored thereon that, in response to execution by a processor, cause the processor to perform operations comprising:
receiving, by the processor, a primary image of a user containing a first set of facial feature data;
comparing, by the processor, the first set of facial feature data to a second set of facial feature data associated with a secondary image of the user, wherein the secondary image is from a social media source; and
authenticating, by the processor, that the primary image depicts the user associated with a user financial account based at least in part on the comparison indicating the first set of facial feature data is representative of the user identified by the second set of facial feature data.

* * * * *